United States Patent
Kato et al.

(10) Patent No.: US 8,444,209 B2
(45) Date of Patent: May 21, 2013

(54) TRIM FOR VEHICLES AND DOOR TRIM FOR VEHICLES

(75) Inventors: Takanori Kato, Nagoya (JP); Masayuki Kito, Miyoshi (JP); Keisuke Kato, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 15 days.

(21) Appl. No.: 13/041,695

(22) Filed: Mar. 7, 2011

(65) Prior Publication Data

US 2011/0221230 A1 Sep. 15, 2011

(30) Foreign Application Priority Data

Mar. 15, 2010 (JP) ................................. 2010-057788

(51) Int. Cl.
*B60R 13/02* (2006.01)
*B60J 5/04* (2006.01)

(52) U.S. Cl.
USPC ............... 296/146.7; 296/187.05; 296/187.12

(58) Field of Classification Search
USPC .................. 296/1.09, 146.1, 146.7, 152, 153, 296/187.03, 187.05, 187.12
See application file for complete search history.

(56) References Cited

U.S. PATENT DOCUMENTS

| | | | | |
|---|---|---|---|---|
| 5,181,759 A * | 1/1993 | Doolittle | ........................ | 296/153 |
| 5,482,344 A * | 1/1996 | Walker et al. | ................. | 296/39.1 |
| 7,658,436 B2 | 2/2010 | Gilleo et al. | | |
| 2006/0290167 A1* | 12/2006 | Hirotani et al. | ............ | 296/146.7 |
| 2009/0134660 A1* | 5/2009 | Pinkerton et al. | .......... | 296/146.7 |
| 2009/0256384 A1* | 10/2009 | Hughes et al. | ................. | 296/153 |

FOREIGN PATENT DOCUMENTS

| | | |
|---|---|---|
| DE | 102005016646 | 1/2006 |
| JP | 2005-088789 | 4/2005 |
| JP | 2008284958 A * | 11/2008 |

* cited by examiner

*Primary Examiner* — Glenn Dayoan
*Assistant Examiner* — Jason S Daniels
(74) *Attorney, Agent, or Firm* — Greenblum & Bernstein, P.L.C.

(57) ABSTRACT

It is an object of the present invention to provide a trim for vehicles capable of reducing the number of parts and thereby reducing the cost when a plurality of shock absorbing portions are required to have different hardnesses from each other. The trim for vehicles according to the present invention is a door trim 20 including a lower board 21, and a pull handle 40 mounted on the lower board 21, further including a plurality of shock absorbing portions with different hardnesses capable of absorbing shock energy, wherein an extension portion 50 of the plurality of shock absorbing portions is formed integrally with the pull handle 40, and the extension portion 50 has a shape extending downward from the pull handle 40.

10 Claims, 6 Drawing Sheets

TRIM FOR VEHICLES AND DOOR TRIM FOR VEHICLES

CROSS REFERENCE TO RELATED APPLICATION

This application claims priority from Japanese Patent Application No. 2010-0577888 filed 15 Mar. 2010. The entire content of this priority application is incorporated herein by reference.

TECHNICAL FIELD

The present invention relates to a trim for vehicles, and a door trim for vehicles.

BACKGROUND

A trim for vehicles including a shock absorbing portion for absorbing shock energy produced in a vehicular crash (for example, a side-impact crash) has been known as trims for vehicles such as door trims. One example of the trim for vehicles is disclosed in Japanese Patent Laid-Open No. 2005-88789. The trim for vehicles (a door trim) disclosed in Japanese Patent Laid-Open No. 2005-88789 includes a plurality of (two in Japanese Patent Laid-Open No. 2005-88789) shock absorbing portions (shock absorbing pads). The shock absorbing portions are separately mounted on the door trim.

The shock absorbing portions may be required to have different hardnesses from each other depending on a position to be mounted on the trim for vehicles. When different hardnesses are required, the respective shock absorbing portions cannot be formed integrally of the same material. It is necessary to form the plurality of shock absorbing portions with different hardnesses as separate members, and provide the shock absorbing portions respectively at corresponding positions to be mounted. When the trim for vehicles includes the plurality of shock absorbing portions as described above, the number of parts increases, and the cost of mounting the parts thereby increases.

SUMMARY

The present invention has been made in view of the aforementioned circumstances, and it is an object of the invention to provide a trim for vehicles and a door trim for vehicles capable of reducing the number of parts and thereby reducing the cost when a plurality of shock absorbing portions are required to have different hardnesses from each other.

To attain the above object, a trim for vehicles according to the present invention includes a trim body portion, a functional part mounted on the trim body portion and a plurality of shock absorbing portions with different hardnesses. The functional part is capable of absorbing shock energy. At least one of the plurality of shock absorbing portions is formed integrally with the functional part.

In the present invention, at least one of the plurality of shock absorbing portions is formed integrally with the functional part mounted on the trim body portion. Accordingly, the number of parts can be reduced, and the cost of assembling the parts can be thereby reduced. To be more specific, it is not necessary to separately provide the shock absorbing portions with different hardnesses. A portion formed integrally with the functional part can be used as at least one of the shock absorbing portions. Thus, the cost can be reduced.

In the above configuration, the trim for vehicles is a door trim including a vehicle door, the functional part is a pull handle for opening and closing the vehicle door, and the at least one of the shock absorbing portions has a shape extending downward from the pull handle. When the at least one of the shock absorbing portions has a shape extending downward from the pull handle, a body part facing a lower region of the pull handle (for example, the thigh), of a passenger seated in a vehicle seat, can be protected by the at least one of the shock absorbing portions formed extending downward from the functional part (the pull handle).

DETAILED DESCRIPTION OF THE PREFERRED ILLUSTRATIVE ASPECTS

Figure 1:
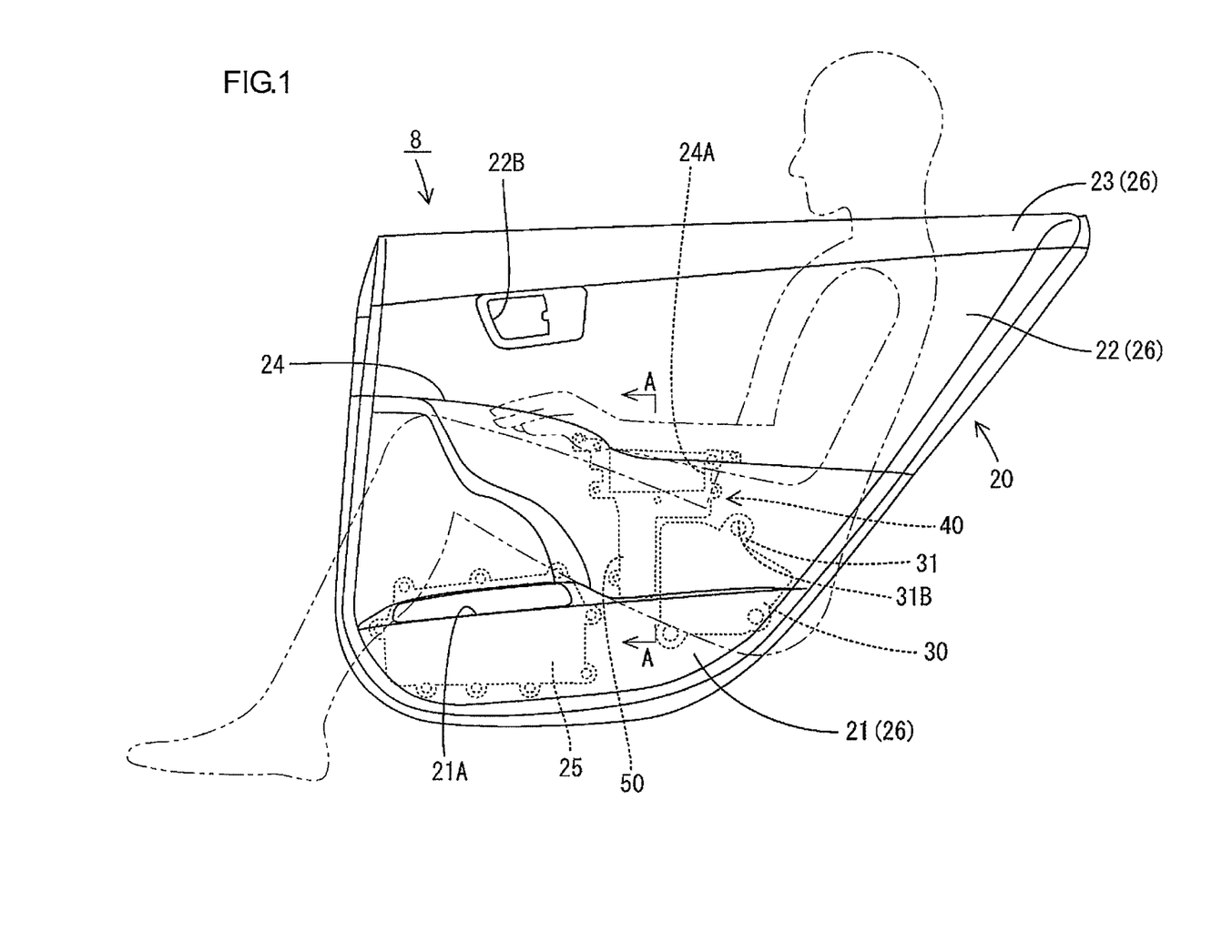
FIG. 1 is a front view illustrating a vehicle door according to one illustrative aspect of the present invention.

One illustrative aspect of the present invention will be described by reference to FIGS. 1 to 6. A trim for vehicles according to the present illustrative aspect is a door trim 20 constituting a vehicle door 8 as shown in FIG. 1. The left side in FIG. 1 is the front side, and the right side is the rear side. The left side in FIG. 5 is the obverse side of the door trim 20 (the inner compartment side), and the right side is the reverse side (the outer compartment side).

Figure 5:
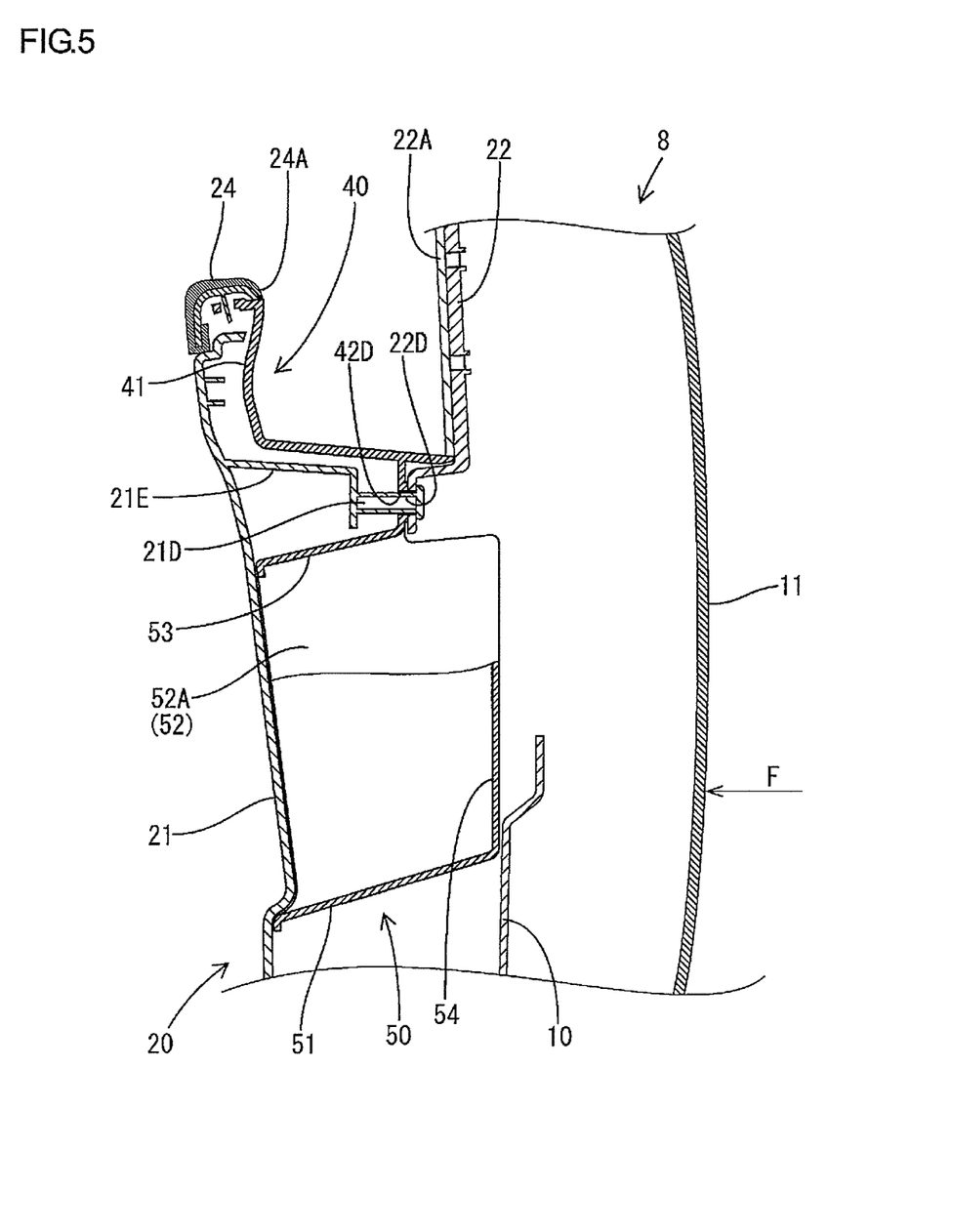
FIG. 5 is a sectional view illustrating a sectional configuration of the vehicle door in FIG. 1 (a view taken along the line A-A in FIG. 1)

The vehicle door 8 according to the present illustrative aspect includes an inner panel 10, an outer panel 11, and the door trim 20 as shown in FIGS. 1 and 5. The inner panel 10 and the outer panel 11 are formed by pressing metal plates such as iron and aluminum, and combining the metal plates, for example. The inner panel 10 is arranged facing the outer panel 11 on the inner compartment side. A window regulator (not shown) or the like for moving a side window pane (not shown) is accommodated between the inner panel 10 and the outer panel 11.

The door trim 20 is an interior material mounted on the inner side (the inner compartment side) of the inner panel 10, to improve the appearance or habitability of a vehicle compartment. In the door trim 20, a trim body portion 26 is formed by coupling three vertically divided boards. The trim body portion 26 includes a lower board 21 constituting a lower portion thereof, a middle board 22 constituting a center portion thereof, and an upper board 23 constituting an upper portion thereof. The lower board 21, the middle board 22, and the upper board 23 are made of a synthetic resin material such as polypropylene, a mixture of a wood-based material and a synthetic resin material, or the like. A skin material 22A (see FIG. 5) is also partially or entirely attached to the inner compartment side of the door trim 20.

The boards 21, 22 and 23 are coupled to each other by inserting a mounting boss formed on one board into a through hole formed in the other board, and welding a distal end portion of the mounting boss by welding means such as ultrasonic welding, for example. The boards 21, 22 and 23 may be also coupled to each other by various coupling methods such as screwing and claw fitting.

An armrest portion 24 used as an armrest by a passenger is formed projecting from the lower board 21 on the inner compartment side. An opening portion 24A that opens upward is formed in the upper surface of the armrest portion 24. A pull handle 40 into which a passenger inserts his finger to open and close the vehicle door 8 is provided below the opening portion 24A.

A door pocket 25 for accommodating an object (for example, a map) is mounted on the reverse side of the lower board 21 at a position close the front side. An opening portion 21A that opens upward is formed in the lower board 21. An object can be inserted into or removed from the door pocket 25 through the opening portion 21A.

Figure 2:
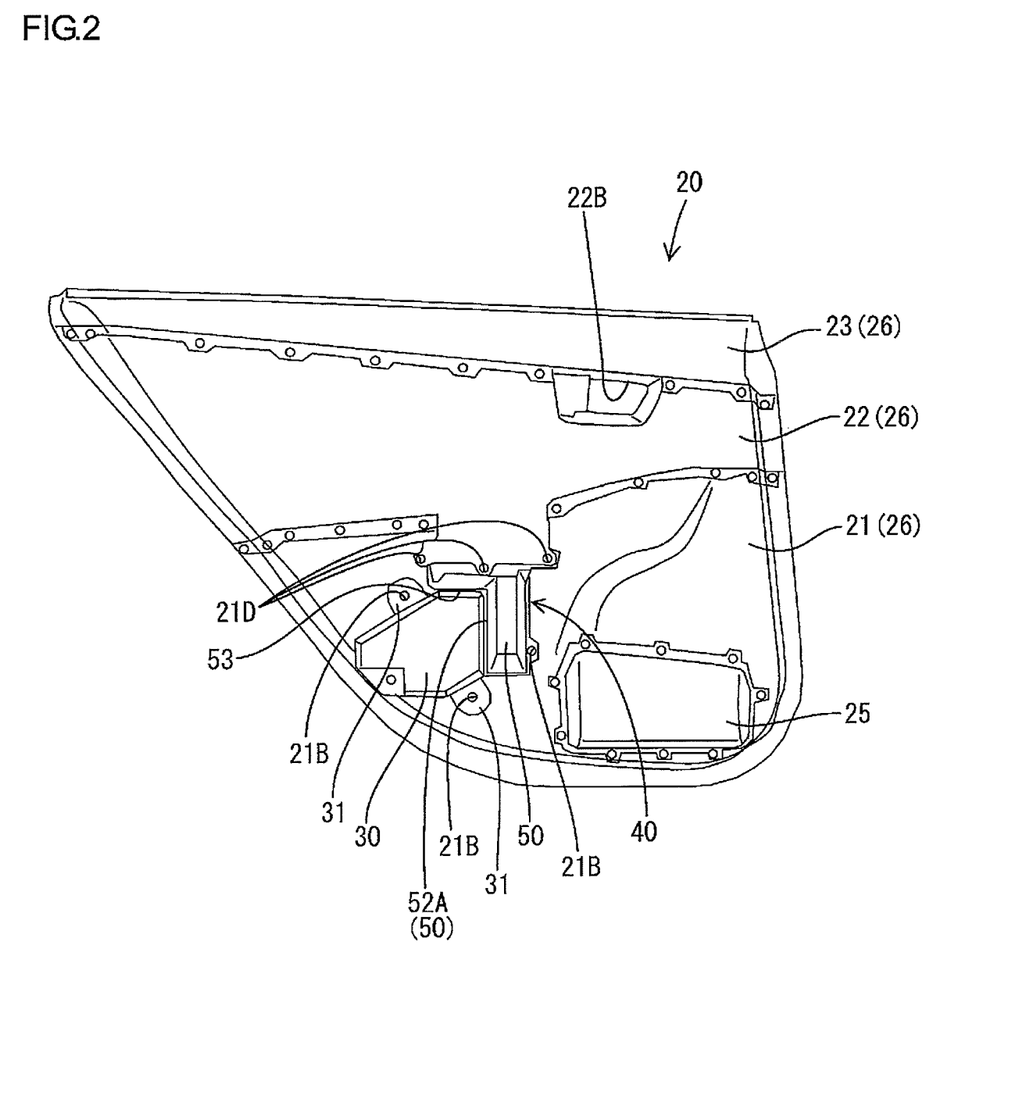
FIG. 2 is a back view illustrating a door trim of the vehicle door in FIG. 1.

The door trim 20 according to the present illustrative aspect includes two types of shock absorbing portions with different hardnesses from each other. To be more specific, a shock absorbing pad 30 described below, and an extension portion 50 of the pull handle 40 (described later) are respectively employed as the shock absorbing portions. As shown in FIGS. 1 and 2, the shock absorbing pad 30 is mounted on the reverse side of the lower board 21 at a position close to the rear side. The shock absorbing pad 30 is formed as a hard foamed material obtained by foaming a synthetic resin material such as urethane and polypropylene containing a foaming agent to about 15 to 45 times, for example. Since the shock absorbing pad 30 enables shock energy to be absorbed (energy absorption: EA) in a side-impact crash on the vehicle door 8, the shock absorbing pad 30 is also called an EA (energy absorption) material.

As shown in FIGS. 1 and 2, a plurality of mounting bearing surfaces 31 are formed in the outer periphery of the shock absorbing pad 30. A mounting hole 31B is formed in each of the mounting bearing surfaces 31. A mounting boss 21B to be inserted into the mounting hole 31B is formed at a position corresponding to each of the mounting holes 31B on the reverse side of the lower board 21. The shock absorbing pad 30 is mounted on the lower board 21 by inserting each mounting boss 21B into each mounting hole 31B of the shock absorbing pad 30, and softening a distal end portion of each mounting boss 21B with heat by ultrasonic welding to effect caulking (thermal caulking).

A handle mounting hole 22B for mounting an inside handle (not shown) for opening and closing the door is formed at a position close to a coupled portion of the middle board 22 with the upper board 23 as shown in FIGS. 1 and 2.

Next, the pull handle 40 mounted on the lower board 21 will be described. The pull handle 40 (a functional part) is made of synthetic resin, for example. The pull handle 40 includes a body portion 41 and a mounting piece portion 42 having a plate shape formed in the periphery of the body portion 41. The body portion 41 has a box shape opening upward and rearward (the vehicle outer side). When the pull handle 40 is mounted on the lower board 21 as shown in FIG. 5, a passenger can insert his hand into the body portion 41 from above through the opening portion 24A of the armrest portion 24.

Figure 4:
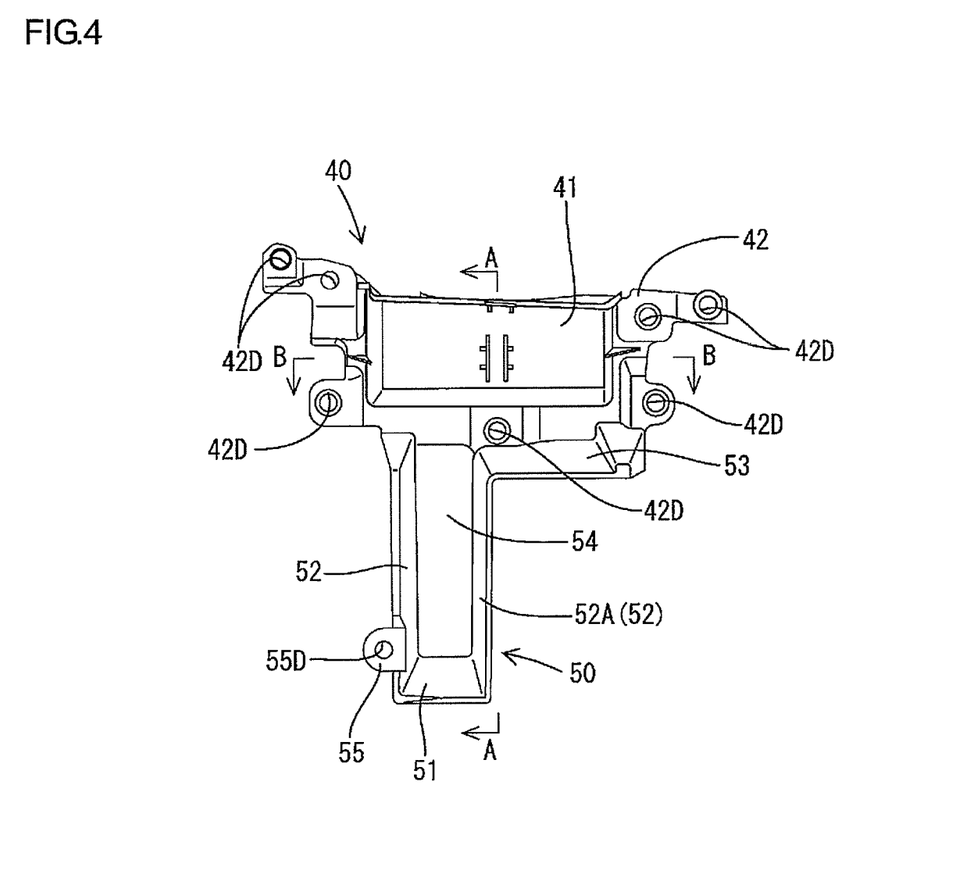
FIG. 4 is a front view illustrating the pull handle in FIG. 3.

The mounting piece portion 42 is formed so as to surround the periphery of the body portion 41 excluding the upper side as shown in the front view of FIG. 4. A plurality of mounting holes 42D are formed in the mounting piece portion 42. Meanwhile, as shown in FIG. 5, an extension portion 21E extending toward the pull handle 40 is formed on the lower board 21 at a position corresponding to the mounting holes 42D. A mounting boss 21D is formed projecting toward the pull handle 40 from the extension portion 21E. The mounting boss 21D can be inserted into each of the mounting holes 42D.

After the mounting bosses 21D are inserted into the mounting holes 42D and mounting holes 22D formed in the middle board 22, a distal end portion of each of the mounting bosses 21D is softened with heat by ultrasonic welding to effect caulking (thermal caulking). The pull handle 40 is thereby mounted on the lower board 21.

Figure 3:
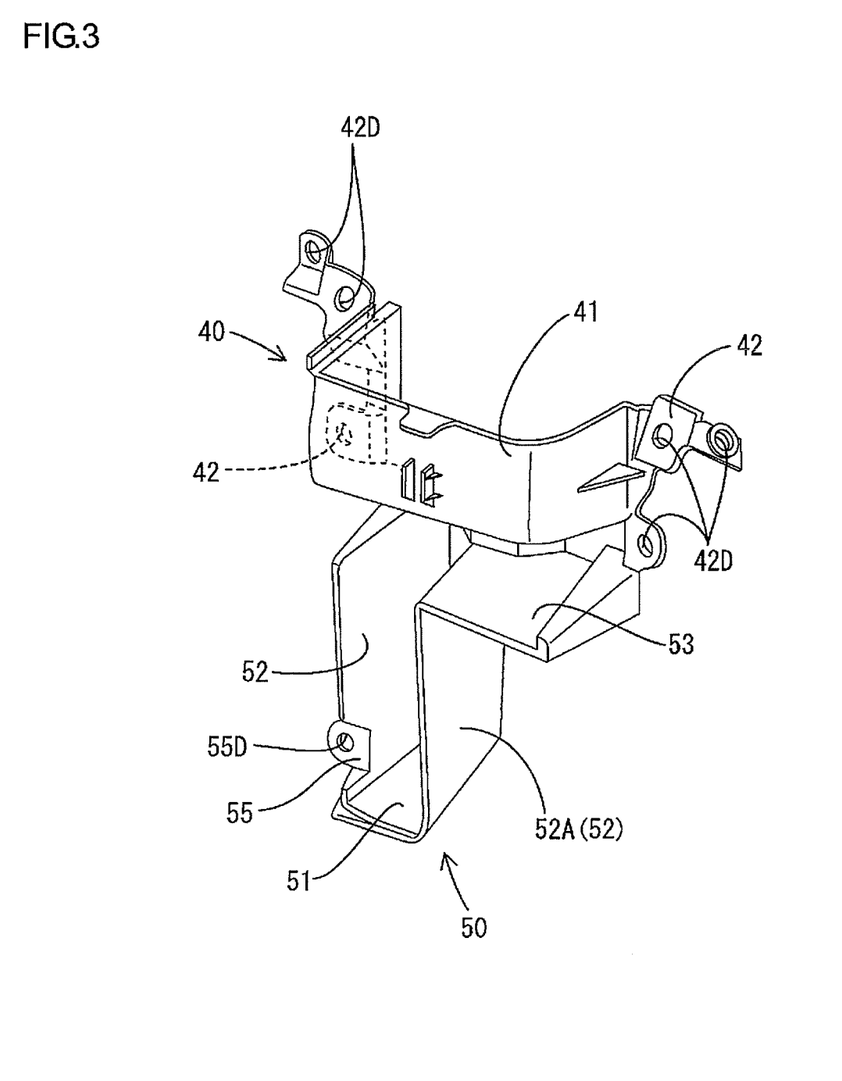
FIG. 3 is a perspective view illustrating a pull handle of the door trim in FIG. 2.

The extension portion 50 having a shape extending downward is provided on the mounting piece portion 42 of the pull handle 40. The extension portion 50 (at least one of the plurality of shock absorbing portions) is formed integrally with the pull handle 40. The extension portion 50 is arranged on the vehicle front side (the left side in FIG. 4) under the body portion 41 as shown in FIGS. 3 and 4.

As shown in FIG. 1, the extension portion 50 is arranged on the vehicle front side from the shock absorbing pad 30 adjacent to the shock absorbing pad 30. To be more specific, the shock absorbing pad 30 is arranged such that a portion thereof is fitted between a side wall 52A on one side (on the right side in FIG. 4) of opposite side walls 52 of the extension portion 50 shown in FIG. 4, and a connecting wall 53 that connects the side wall 52A and the mounting piece portion 42 (see also FIG. 2). Among the body parts of a passenger seated in a seat (indicated by the alternate long and two short dashes line) shown in FIG. 1, the shock absorbing pad 30 is arranged at a position facing the waist, and the extension portion 50 is arranged at a position facing the thigh in the present illustrative aspect.

Figure 6:
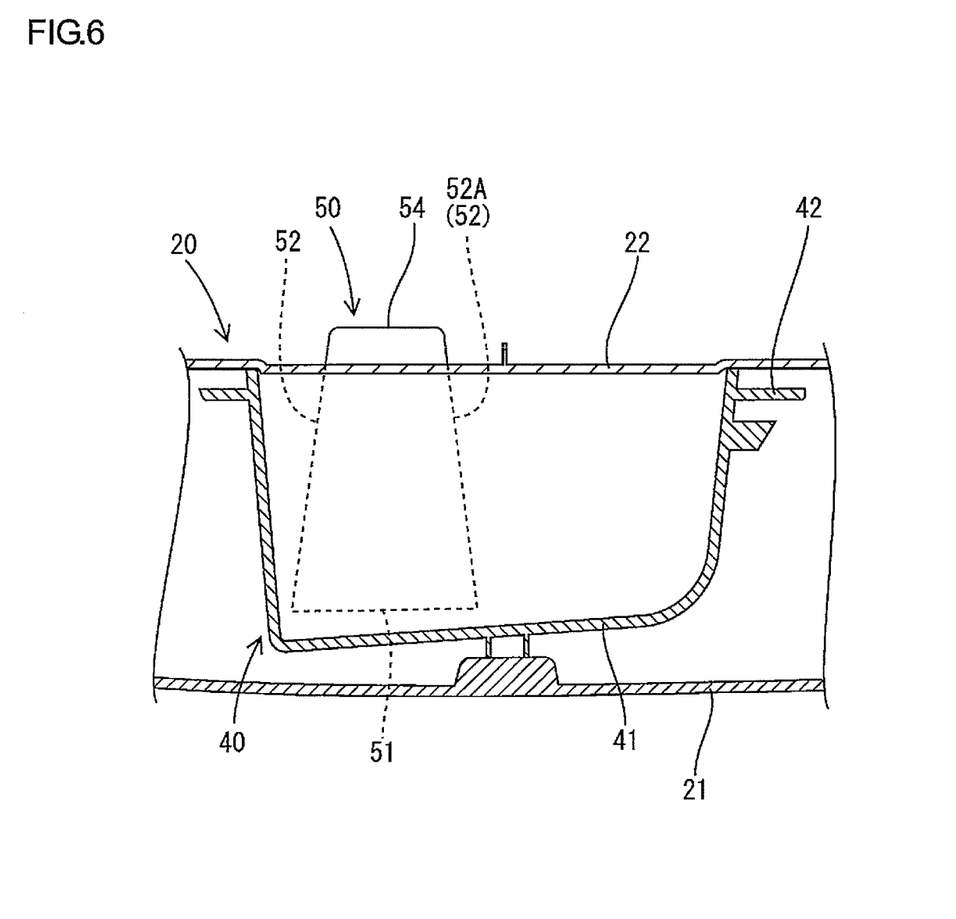
FIG. 6 is a sectional view illustrating a sectional configuration of the door trim in FIG. 2 (corresponding to a view taken along the line B-B in FIG. 4).

The extension portion 50 has a vertically-long box shape that opens upward and on the obverse side. As shown in FIGS. 3 and 6, a bottom wall 51 constituting the extension portion 50 forms an approximately trapezoidal shape such that the width increases toward the inner compartment side (the lower side in FIG. 6). The opposite side walls 52 constituting the extension portion 50 are arranged such that their opposing interval increases toward the front side. The skin material 22A is not shown in FIG. 6. As shown in FIGS. 3 and 4, a mounting piece portion 55 is also formed on the side wall 52 on the vehicle front side of the extension portion 50. A mounting hole 55D is formed through the mounting piece portion 55. A mounting boss 21B extending from the lower board 21 is inserted into the mounting hole 55D to mount the extension portion 50 by thermal caulking or the like (see also FIG. 2).

In the present illustrative aspect, the hardness of the shock absorbing pad 30 and the hardness of the extension portion 50 are different from each other. For example, the extension portion 50 is harder than the shock absorbing pad 30. The "hardness" here can be obtained by compressing a shock absorber of the shock absorbing pad 30 or the extension portion 50 at a predetermined compression rate, and measuring a compression load when the shock absorber reaches a predetermined compressed thickness to calculate a compression stress. The hardness (or strength) of the extension portion 50 can be set to an appropriate value by changing the thickness of each wall portion constituting the extension portion 50 or by forming a rib.

Next, an operation when a vehicle having the vehicle door 8 (the door trim 20) according to the present illustrative aspect is hit from the side (a side-impact crash) will be described. As shown in FIG. 5, when a shock load (the arrow F in FIG. 5) is applied to the outer panel 11 from the outer compartment side in the side-impact crash, the inner panel 10 is pressed by the outer panel 11, and the extension portion 50 is pressed by the inner panel 10 from a rear wall 54, for example. A passenger presses the door trim 20 from the inner compartment side toward the outer compartment side due to an inertia force. The extension portion 50 is thereby crushed to absorb shock energy produced in the side-impact crash. The opposite side walls 52 of the extension portion 50 are arranged such that their opposing interval increases toward the front side. Thus, when the extension portion 50 is pressed from the rear wall 54, the opposite side walls 52 tends to be deformed to widen the opposing interval, and are thus easily crushed. The extension portion 50 can thereby more effectively absorb the shock energy produced in the side-impact crash. The shock absorbing pad 30 is also deformed to be crushed, thereby absorbing the shock energy in the side-impact crash.

As described above, the door trim 20 according to the present illustrative aspect includes the trim body portion 26 (the respective boards 21, 22, and 23), and the pull handle 40 mounted on the lower board 21, further including the plurality of shock absorbing portions (the shock absorbing pad 30 and the extension portion 50) with different hardnesses capable of absorbing the shock energy. The extension portion 50 is formed integrally with the pull handle 40. Accordingly, the number of parts can be reduced, and the cost of assembling the parts can be thereby reduced. To be more specific, it is not necessary to separately provide the two shock absorbing portions with different hardnesses. The portion formed integrally with the pull handle 40 (the functional part) can be used as at least one of the shock absorbing portions (the extension portion 50), so that the cost can be reduced. Accordingly, in the present illustrative aspect, the door trim 20 including the plurality of shock absorbing portions (the shock absorbing pad 30 and the extension portion 50) with different hardnesses, and capable of reducing the number of parts and thereby reducing the cost can be provided.

The extension portion 50 has a shape extending downward from the pull handle 40. Thus, when a passenger is seated in a vehicle seat, a body part (the thigh or the like) of the passenger facing a lower region of the pull handle 40 can be protected. Particularly, the pull handle 40 is often designed to be located close to a portion of the door trim 20 facing the thigh of a passenger. Thus, to protect the thigh, the extension portion 50 is formed on the pull handle 40, so that the extension length of the extension portion 50 is reduced as compared to a configuration in which the extension portion 50 extends from a member other than the pull handle 40. Accordingly, the amount of material used can be reduced, and the cost or the like can be further reduced.

[Other Illustrative Aspects]

The present invention is not limited to the illustrative aspect described above by reference to the drawings, and illustrative aspects as below are also included in the technical scope of the present invention, for example.

(1) Although the door trim 20 is employed as an example of the trim for vehicles in the aforementioned illustrative aspect, the present invention is not limited to the configuration. A headliner for vehicles or the like may be also employed as the trim for vehicles.

(2) The case in which at least one of the shock absorbing portions (the extension portion 50) is formed integrally with the pull handle 40 is described as an example in the aforementioned illustrative aspect. However, the present invention is not limited thereto. At least one of the shock absorbing portions may be formed integrally with a functional part mounted on the trim body portion 26. Examples of the functional part include the door pocket 25, the middle board 22, and an assist grip (not shown) in addition to the pull handle 40.

(3) Although the configuration in which the two shock absorbing portions (the shock absorbing pad 30 and the extension portion 50) are provided is described as an example in the aforementioned illustrative aspect, the present invention is not limited thereto. Three or more shock absorbing portions may be also provided. A position to arrange each shock absorbing portion may be also changed to any position.

(4) In the aforementioned illustrative aspect, the thermal caulking for welding the mounting boss is employed as an example as the means for mounting the pull handle 40 and the shock absorbing pad 30 on the lower board 21. However, the present invention is not limited thereto. Various mounting means such as screwing or claw fitting may be employed as the means for mounting the pull handle 40 and the shock absorbing pad 30 on the lower board 21.

(5) Although the door trim 20 includes the plurality of separate parts such as the lower board 21, the middle board 22, and the upper board 23 in the aforementioned illustrative aspect, the parts may be formed into an integral part.

What is claimed is:

1. A trim for a panel assembly of a vehicle including an inner panel and an outer panel, the trim comprising:
    a trim body mounted on an inner compartment side of the inner panel;
    a functional part mounted on the trim body; and
    a plurality of shock absorbing parts with different hardnesses configured to absorb shock energy, the plurality of shock absorbing parts including:
    a first shock absorbing part integrally provided with the functional part so as to extend from the functional part and mounted on a first portion of the trim body on an inner panel side; and
    a second shock absorbing part mounted on a second portion of the trim body, the second shock absorbing part having a hardness different from a hardness of the first shock absorbing part, wherein
    the first shock absorbing part is a box-like shape with an opening provided on a trim body side thereof.

2. The trim according to claim 1, wherein the second portion of the trim body is located adjacent to the first portion of the trim body.

3. The trim according to claim 1, wherein the second shock absorbing part is a shock absorbing pad made of a foamed material.

4. The trim according to claim 1, wherein the first shock absorbing part is a truncated pyramid-like shape with an opening provided on the trim body side thereof, and
    wherein a width of the first shock absorbing part increases toward the trim body.

5. The trim according to claim 1, wherein the first shock absorbing part is harder than the second shock absorbing part.

6. A trim for a side door panel of a vehicle including an inner panel and an outer panel, the trim comprising:
    a trim body mounted on an inner compartment side of the inner panel;
    a functional part mounted on the trim body, the functional part including a functional portion and a shock absorbing portion extending from the functional portion, such that the functional part is formed as a single unit the shock absorbing portion being configured to absorb shock energy and mounted on an inner panel side of the trim body; and
    a shock absorbing part configured to absorb shock energy and mounted on the trim body adjacent to the shock absorbing portion of the functional part in a front-rear direction of the vehicle, the shock absorbing part having a hardness different from a hardness of the shock absorbing portion of the functional part.

7. The trim according to claim 6, wherein the trim is a door trim including a vehicle door;
   the functional part is a pull handle for opening and closing the vehicle door; and
   the shock absorbing portion of the functional part extends downward from the pull handle.

8. The trim according to claim 7, wherein the shock absorbing portion of the functional part is arranged at a position facing a thigh of a seat occupant when the seat occupant is seated, and
   wherein the shock absorbing part is arranged at a position facing a waist of the seat occupant when the seat occupant is seated.

9. The trim according to claim 6, wherein the shock absorbing portion of the functional part includes:
   a connecting wall that continues from the functional portion;
   opposing side walls that extend downwardly from the connecting wall; and
   a bottom wall that extends between the opposing side walls.

10. The trim according to claim 9, wherein the shock absorbing portion of the functional part further includes:
    a rear wall extending between the opposing side walls and connected to the bottom wall at a rear side of the bottom wall,
    wherein the functional part is mounted on the trim body such that the rear wall faces the inner panel when the trim is mounted to the inner panel, and
    wherein when the rear wall is pressed by the inner panel during a side impact collision, the opposing side walls deform such that a distance therebetween increases.

* * * * *